J. NEUMANN.
BELTING.

No. 175,373. Patented March 28, 1876.

WITNESSES:
C. Neveux
John Goethals

INVENTOR:
J. Neumann
BY
ATTORNEYS.

UNITED STATES PATENT OFFICE.

JOHN NEUMANN, OF BROOKLYN, NEW YORK.

IMPROVEMENT IN BELTINGS.

Specification forming part of Letters Patent No. 175,373, dated March 28, 1876; application filed March 6, 1876.

*To all whom it may concern:*

Be it known that I, JOHN NEUMANN, of Brooklyn, in the county of Kings and State of New York, have invented a new and Improved Metal Belt, of which the following is a specification:

My invention consists of broad metal links with notches in the ends, forming loop-shaped projections for interlocking, one link with another, by arranging the projections of one in the notches of the other, and inserting a couple of pins, which pins are so arranged that they roll one on the other when the chain bends around the pulleys, and avoid any sliding-friction in the connection of the links, by which the wear is lessened and the chain runs easier. My invention also consists of plates attached to the sides of the link to adapt the belt for grooved pulleys, the plates being so arranged as to fit the sides of a tapered groove, and having a little flexure in the connection with the links, so that they accommodate themselves to the angle of the sides of the groove. These plates are connected to the links in a simple and inexpensive manner, which also constitutes a part of the invention.

Figure 1:
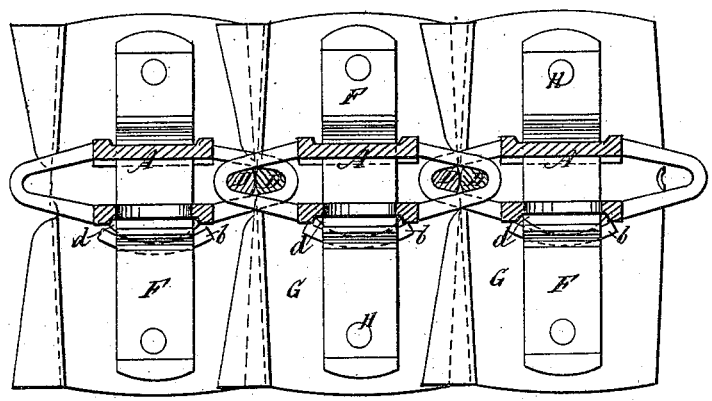
Figure 2:
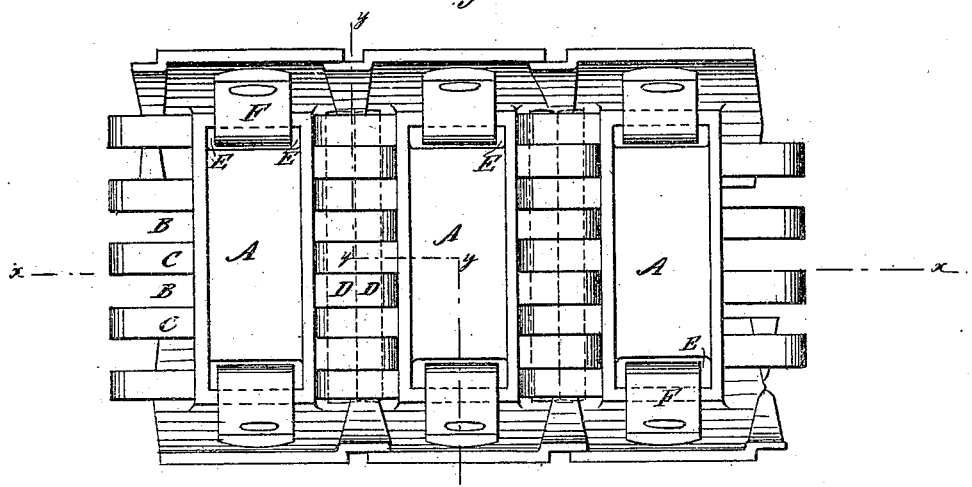
Figure 3:
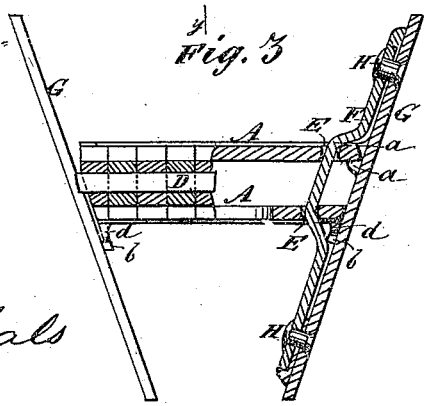

Figure 1 is a longitudinal sectional elevation of a chain contrived according to my invention. Fig. 2 is a plan view; and Fig. 3 is a transverse section.

Similar letters of reference indicate corresponding parts.

A represents the links, which are broad and flat, and constructed with notches B at the ends for interlocking the links together, so as to connect them, by two pins, D, inserted in the loop-shaped projections, and these pins are constructed with surfaces which roll together when the belt bends, and allow of their bending, in passing around the pulleys, without any sliding-friction. The links also have slots E along the sides, through which the bars F are arranged, which attach the side plates G, which are added to adapt the belt for running in grooved pulleys. These links are made wider on the upper side, and the slots are correspondingly arranged, to incline the side plate to correspond with the angles of the grooves of the pulleys. The side plates G close against the ends of the pins D and prevent them from working out. The plates G have ribs $a$, for reception of the upper edge of link A, and the curved rib $b$, for a rest to correspondingly-curved bars $d$ of the under side of the link, to take the strain of the links when going over the pulleys. The links will be made in malleable cast-iron, for cheapness; but they may be wrought, if preferred, or made of bar or sheet steel, being punched out in long pieces, with two sets of notches, B, and bent up and welded in the plain part between the notches; or may be cast of steel, the bars F and the plates G may be struck out of sheet metal cheaply, and will be fastened by rivets H, which are the only finishing required in securing the parts together. The arrangement affords a very simple and cheap belt, which is also calculated to be very efficient.

Having thus described my invention, I claim as new and desire to secure by Letters Patent—

1. The combination of links A, having notches B and looped projections C, and the connecting-pins D, having oval surfaces of the sides bearing together, substantially as specified.

2. The combination of the inclined side plates G with the links A, substantially as specified.

3. The side plates G, connected to the links A by the plates F, arranged in slots E, and riveted to the plates, substantially as specified.

4. The combination of ribs $a$ and $b$ on plate G with the link A, substantially as specified.

JOHN NEUMANN.

Witnesses:
ALFRED A. GALLAGHER,
OTTO NEUMANN.